US008730152B2

(12) United States Patent
Hare et al.

(10) Patent No.: US 8,730,152 B2
(45) Date of Patent: May 20, 2014

(54) SYSTEM AND METHOD FOR REINITIALIZING A SCREEN CONTROLLER OF AN ELECTRONIC DISPLAY DEVICE

(75) Inventors: Robert L. Hare, San Diego, CA (US); Samson Huang, Saratoga, CA (US); Garth Conboy, La Jolla, CA (US); Serge Rutman, Boulder Creek, CA (US); Genisim Tsilker, Cupertino, CA (US)

(73) Assignee: Google Inc., Mountain View, CA (US)

( * ) Notice: Subject to any disclaimer, the term of this patent is extended or adjusted under 35 U.S.C. 154(b) by 1218 days.

(21) Appl. No.: 12/575,236

(22) Filed: Oct. 7, 2009

(65) Prior Publication Data

US 2011/0080392 A1 Apr. 7, 2011

(51) Int. Cl.

*G09G 3/34* (2006.01)
*G06F 3/038* (2013.01)
*G02B 26/00* (2006.01)

(52) U.S. Cl.

USPC ............................ 345/107; 345/204; 359/296

(58) Field of Classification Search

USPC ............ 345/84, 107, 204, 208–210; 359/290, 359/296

See application file for complete search history.

(56) References Cited

U.S. PATENT DOCUMENTS

2006/0232547 A1* 10/2006 Johnson et al. ............... 345/107
2007/0205978 A1* 9/2007 Zhou et al. .................... 345/107

* cited by examiner

*Primary Examiner* — Lun-Yi Lao
*Assistant Examiner* — Jarurat Suteerawongsa
(74) *Attorney, Agent, or Firm* — Fenwick & West LLP

(57) ABSTRACT

A system for and method of reinitializing a screen controller of an electronic display device, such as an electrophoretic display, are disclosed. The system may comprise at least one computer processor associated with a screen controller of an electrophoretic display device, where the at least one computer processor may be configured to initialize screen controller registers, loading a waveform into the screen controller of the electrophoretic display device, copying previously stored screen image data stored in direct memory access to current storage of the screen controller; and executing an update process to efficiently reinitialize the screen controller of the electrophoretic display after panel power to the electrophoretic display is provided by at least one power source of the electrophoretic display.

16 Claims, 7 Drawing Sheets

SYSTEM AND METHOD FOR REINITIALIZING A SCREEN CONTROLLER OF AN ELECTRONIC DISPLAY DEVICE

FIELD OF THE INVENTION

The present invention generally relates to a system for and method of controlling an electronic display. More specifically, the present invention relates to a system and method for efficiently reinitializing a screen controller to match current content of a bi-stable screen of an electronic display device.

BRIEF DESCRIPTION OF THE DRAWINGS

The present invention, together with further objects and advantages, may best be understood by reference to the following description taken in conjunction with the accompanying drawings, in the several figures of which like reference numerals identify like elements, and in which.

DETAILED DESCRIPTION OF EMBODIMENTS

Figure 1:
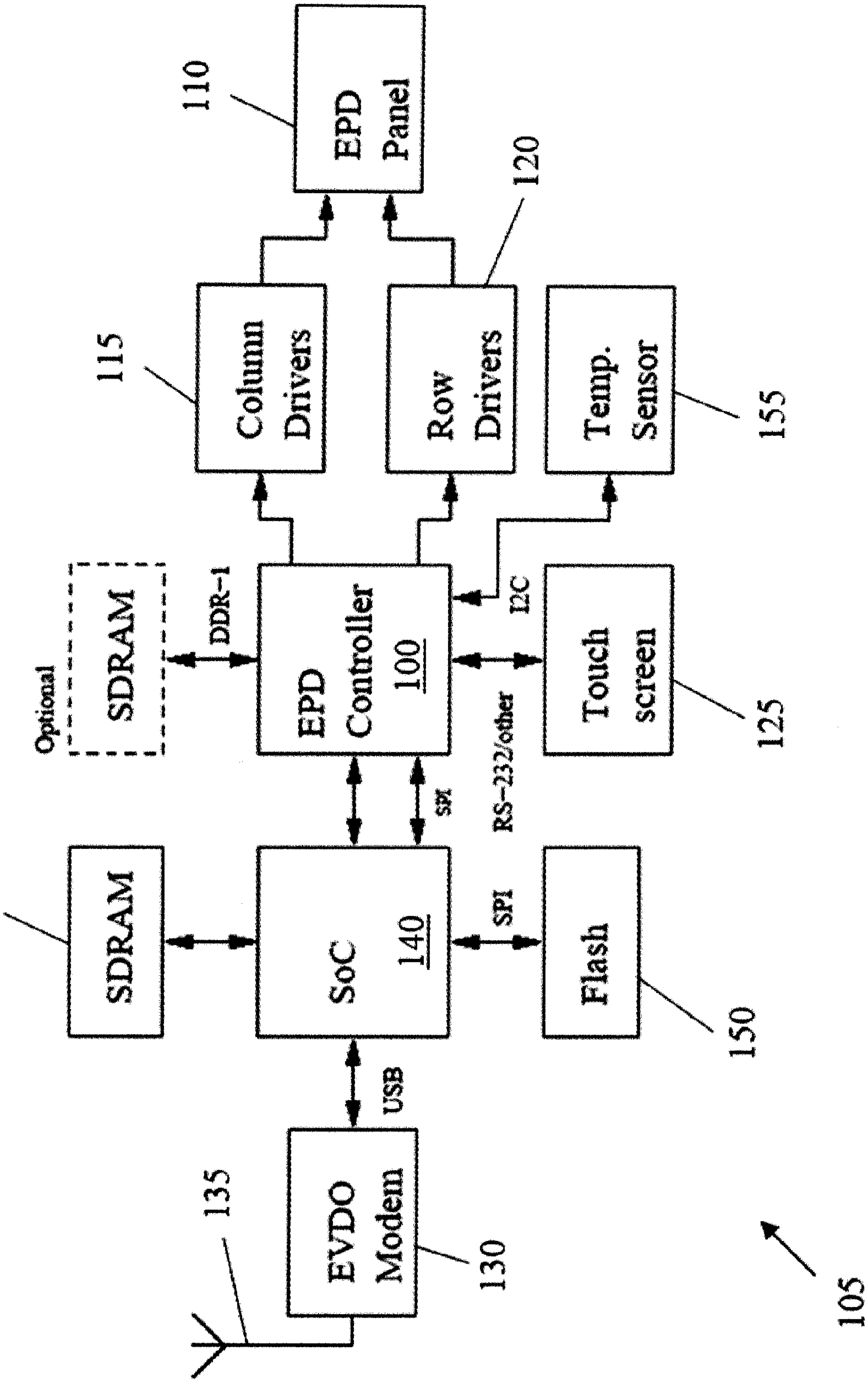
FIG. 1 depicts a schematic diagram of an electronic paper display ("EPD") controller in an electronic book according to an embodiment of the present invention.

Certain embodiments of the present invention provide a controller for a display. More particularly, certain embodiments of the present invention provide a system for and method of controlling electronic paper displays (referred to herein as "EPD"), such as electrophoretic displays or electrowetting displays. Examples of such displays include those disclosed in U.S. Pat. Nos. 6,577,433, 6,529,313, 6,525,866, 6,574,034, 6,017,584, 6,067,185, 6,118,426, 6,120,839, 6,124,851, 6,130,774, 6,172,798, 6,177,921, 6,232,950 and 6,249,271.

EPDs generally present engineering issues that are absent from, for example, cathode ray tube ("CRT") displays. One example has to do with how EPDs use electrostatic forces to create images. A single EPD may utilize positive, negative and neutral voltages to affect image depictions and image changes. More particularly, each EPD pixel may receive (at different times) positive, negative or neutral voltages, which, in combination, select the color or shade of gray embodied in such pixel. The use of both positive and negative voltages generally implicates the use of a controller that can translate image data (e.g., in the form of data on a pixel bus) into signals sufficient to affect the display of the corresponding image on an EPD. Certain embodiments of the present invention therefore provide a controller that can translate image data received from a host system into signals (e.g., sequences of targeted positive and negative voltages) that may be applied to an EPD to display and change images.

EPDs generally respond to image changes slower than, for example, CRT displays. As a result, some EPDs may require transitioning between intermediate states in order to change from displaying one image to another. This relative slowness presents engineering challenges in displaying video or real-time user interface features such as mouse pointers and cursors. As yet another example, EPDs are persistent (i.e., state bistable) in that they may retain their displayed image in the absence of power. The persistence of EPD images creates a unique engineering feature not present in, for example, CRT displays. As yet another example, EPDs may require temperature monitoring and corresponding adjustment of input parameters. Thus, a feature of a bistable EPD is that screen image may persist for minutes, hours, and/or days without requiring constant maintenance from the screen controller. Ultimately, this may lead to a desire to turn "off" the display controller to lengthen battery life. These and other engineering factors create a need for a controller capable of meeting the unique needs of an EPD.

A bi-stable screen controller typically works with the notion of "current," "new," and "old" image pixels, as well as other pixel state information. These designations of pixel state may allow two changes to be stored in controller memory for each pixel. The bi-stable screen controller may use a succession of voltages (e.g., waveforms) to change between two given pixel values. If the screen controller is turned off (e.g., to save battery), a bi-stable screen may continue to display a persistent visual image, as described above. However, when the screen controller is reactivated, the screen controller may need to re-learn the "old" image pixels before successfully transitioning to the "new" image pixels. For example, once the "old" pixel state has been transitioned to the "new" pixel state, the "current" pixel state may then be processed.

In addition to these actual pixel values, there may be additional state information stored in the pixel state memory (e.g., notably a step count). Assuming the current pixel data is allowed to completely refresh itself to the screen or display before power from the display controller is removed, it should be appreciated that the pixel state memory may largely depend on the current pixel value. In some embodiments, a host may have access to current pixel data that was last sent to the display; for example, the host may retain a host copy of memory (e.g., a "shadow buffer") that was the source of most recent DMA to the screen, or before shutting down, copy the "current pixel" data back from the display controller (e.g., using a 1 MB memory transfer rather than a full state copy of 5 MB). A pixel look-up table at the screen controller may also include, among other things, waveform information that may be used to advance state and manipulate pixels. By introducing a special waveform, the complete pixel state memory in the screen controller of an electrophoretic display may be re-initialized quickly based on only knowing the current pixel values.

Some possible attempts to achieve such functionality may include: (1) initializing and redrawing current content; (2) redrawing current image with screen panel voltages disabled; (3) saving and restoring 4 MB of controller memory across a 16-bit bus; and (4) interleaving known pixels with other data and restoring to 4 MB of controller memory. However, these attempts may often result in relative delay (e.g., several seconds), be very visibly distracting, and/or require inefficient resource management and processing.

Accordingly, conventional systems and methods do not provide a technique for re-learning the displayed pixels quickly, without causing transient visual artifacts on the screen (e.g., as seen in erase and redraw attempts). The more quickly (and more battery efficiently) re-initialization is accomplished, the more the persistent image feature (e.g., when turning off the screen controller) may be used to save battery, provide efficient delivery of electronic content, etc.

FIG. 1 is a schematic diagram of an EPD controller 100 in an electronic book 105 according to an embodiment of the present invention. EPD controller 100 is coupled to EPD 110 via column drivers 115 and row drivers 120. EPD 110 displays content in accordance with the system of electronic book 105. EPD controller 100 is also coupled to touch screen component 125, which may be coextensive with EPD 110. That is, EPD 110 may include touch screen capabilities by way of incorporation of touch screen 125. An exemplary such EPD is disclosed in U.S. patent application Ser. No. 12/332,860 entitled "Touch-Sensitive Illuminated Display," filed Dec. 11, 2001, the contents of which are hereby incorporated by reference. EPD controller 100 is further coupled to external memory 130. External memory 130 may be, by way of non-limiting example, an SDRAM integrated circuit. EPD controller 100 is further coupled to a sub-system that allows electronic book 105 to send and receive data, such as book, magazine and newspaper content. The subsystem includes evolution data optimized ("EVDO") modem 130, which itself is coupled to antenna 135 and to a system-on-chip application specific integrated circuit ("ASIC") 140. ASIC 140 acts as an intermediary between EVDO modem 130 and EPD controller 100. ASIC 140 is further coupled to external volatile memory 145 (e.g., an SDRAM integrated circuit) and to external persistent memory 150 (e.g., a flash memory integrated circuit). An external temperature sensor 155 is coupled to EPD controller 100.

Figure 2:
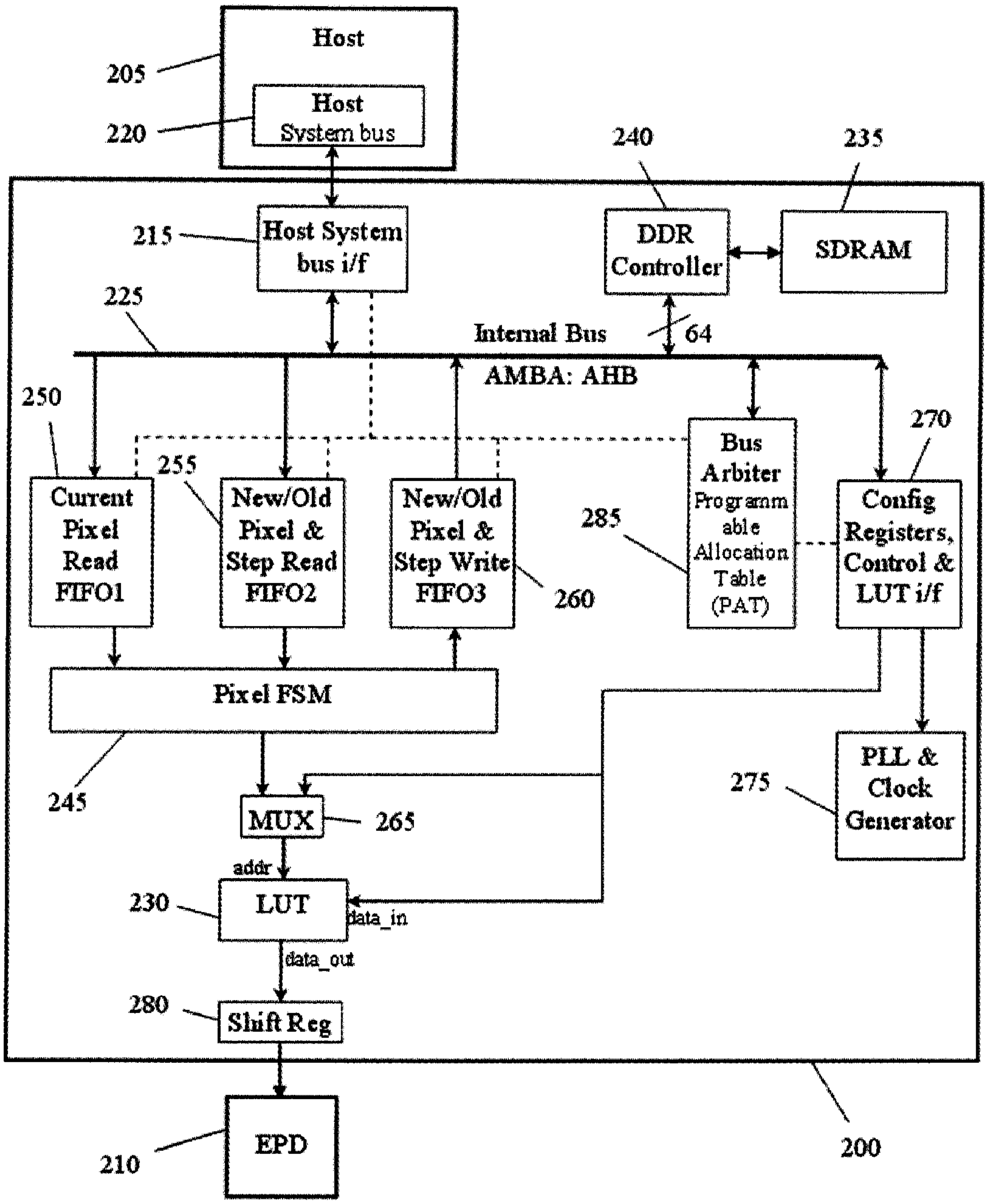
FIG. 2 depicts a schematic diagram of an EPD controller 200 according to an embodiment of the present invention.

FIG. 2 is a schematic diagram of an EPD controller 200 according to an embodiment of the present invention. EPD controller 200 may be implemented on, by way of non-limiting example, an ASIC, a field programmable gate array ("FPGA") or a dedicated integrated circuit. The embodiment illustrated in FIG. 2 may be installed in an electronic book or any other device that includes or directs an EPD.

EPD controller 200 is coupled to host 205 and to EPD 210. In general, EPD controller receives instructions and image data from host 205 and produces an output, which drives EPD 210. EPD controller thus includes a host bus interface 215. Host bus interface 215 may communicate with a host system bus 220 using the host's data flash interface. Host system bus 220 may be an addressable bus with shared address and data input/output capabilities. Alternately, a pixel bus may be employed. The data flash interface may utilize a variable length input/output ("VLIO") running a low order addressing mode. EPD controller 200 may use a ready pin to inform host 205 that it is ready for the next transmission. An exemplary host interface is a Monahans_LV manufactured by Marvell Semiconductor, Inc. of Santa Clara, Calif. Host system bus interface 215 is operably coupled to EPD controller internal bus 225, discussed in detail below in reference to FIG. 3.

EPD controller 200 also includes a pixel look-up table ("LUT") 230. In general, transitioning from one image displayed on an EPD to another image displayed on an EPD (e.g., when turning a page in an electronic book) involves multiple steps. That is, changing from one image to another may involve a series of transitional images. Note that the transitional images may be too fleeting to be visible to the naked eye. Herein, an image displayed on an EPD is referred to as a "frame." Thus, changing from one frame to another may involve multiple steps, each of which may be invisible to the observer. More particularly, changing a single pixel in a frame may involve multiple steps. With each step, EPD controller 200 causes a signal, corresponding to a transitional pixel state, to be sent to EPD 210. The signal may be a positive, negative or zero voltage. Thus, EPD controller may produce a two-bit output, where three of the four possible two-bit states correspond to positive, negative or zero voltages. By way of non-limiting example, two-bit outputs of "00" or "11" may both map to a zero volt output signal (0V), a two-bit output of "01" may map to a positive fifteen volt output signal (+15V), and a two-bit output of "10" may map to a negative fifteen volt output signal (−15V). Thus, each two-bit output causes the pixel at issue to transition to one or more different intermediate states, until the pixel reaches a final state, concluding the frame change. The collection of steps that change one displayed pixel to another are referred to herein as a "waveform." It should be appreciated that some parts of the pixel state information in EPD controller 200 memory (e.g. the step count) may be rewritten or updated as each pixel is processed. As described in greater detail below, LUT 230 provides information regarding transitional states. More particularly, LUT 230 may accept as input a old pixel state, a new pixel state and a transition count, and output a representation of an appropriate signal for the next transitional state (or for a final state). In short, LUT 230 stores waveform information.

Waveforms may be temperature dependent. Accordingly, LUT 230 may store complete waveform data corresponding to 2, 4, 8, 16, 32, 64 or 128 different temperatures. Temperatures accounted for may range from, e.g, 125° C. through −55° C. To sense temperature, an external temperature sensor (e.g., 155 of FIG. 1) may be used. An exemplary temperature sensor is LM75 available from National Semiconductor. The temperature data may be represented in nine bits, two's complement format, with a least significant bit equal to 0.5° C. Note that EPD controller 200 may account for temperature-dependent EPD display requirements in a manner that may be transparent to host 205. That is, host 205 need only supply image data (e.g., in the form of data on a pixel bus) to EPD controller 200 for the corresponding image to be successfully displayed on EPD 210. Host 205 may or may not separately monitor and account for temperature-dependent EPD requirements.

EPD controller 200 also includes a memory 235, which may be internal or external to EPD controller 200. Memory 235 is linked to EPD controller internal bus 225 via double data rate ("DDR") controller 240. Memory 235 includes three memory sections for storing "old," "new" and "current" (i.e., transitional) pixel states. The old pixel state portion of memory 235 stores the states of an existing frame or a frame that is in the midst of being transitioned to a new frame. Memory 235 also includes a new pixel state portion. The new pixel state portion stores the states of a frame to which EPD 210 is transitioning. As discussed in detail below, a portion of memory 235 stores current pixel states, which represent transitional states between the old pixel states and the new pixel states.

Current pixel state data are stored in a frame buffer portion of memory 235. Frame buffer portion of memory 235 is visible to host 205. The current pixel state data stored in frame buffer portion of memory 235 are intended to represent actual pixel states, including intermediate or transitional steps between frames. That is, the current pixel states may correspond to portions of a waveform between new and old pixel states. Memory 235 also includes a step counter portion for tracking which step of a multi-step frame transition is being processed. In some embodiments, there are up to 256 steps between any two frames; in such embodiments, the step counter portion of memory 235 may be eight bits long so that up to 256 steps may be tracked.

In at least one exemplary screen controller, for example, the primary controller state information may be stored in a DRAM with 20 bits of information per pixel. The most recently displayed pixel values (e.g., "current" pixel) may be stored in a distinct or separate 1 MByte region (e.g., 4 bits/pixel) in display controller memory, e.g., in normal operation, the host may frequently change these values and an efficient bus or dma path to the EPD controller 200 may be assumed. It should be appreciated that as long as the host retains an original copy of this memory when shutting down the EPD controller 200, it may be used to recreate the full 20 bit (e.g., times 2 million) controller state. The remaining 4 MByte region (16 bits/pixel) may contain the "old," "new," and/or "step count" values. When the screen is not in the process of being updated, the "old" and "new" values may be identical and correspond to the pixel value currently visible on the EPD. This memory region may be optimized for pipelined reads and writes within the EPD controller 200 and may be quite inefficient for host accesses.

The frame buffer portion of memory 235 may be treated as a pixel cache. This caching feature can significantly reduce memory 235 bandwidth requirements when only a portion of a frame is updated (described below in reference to FIGS. 5 and 6).

The frame buffer portion of memory 235 may be divided up into a number of "lines" for pixel processing purposes. Each line may be consistent with the size of a burst read from memory 235. Burst reads of 32 and 128 bits may be selected. Note that each burst read from frame buffer portion of memory 235 may contain bits that represent 16 current pixels or four old and new pixel pairs. By way of non-limiting example, each frame may consist of 3750 lines.

A line is referred to as "clean" if all the pixels in the line have completed their update in the EPD 210 (i.e., all the pixels in the line meet the conditions of "current pixel=new pixel=old pixel," and "step count=end"). A line is referred to as "dirty" if the host writes one or more new current pixels into the line.

During display update, the entire new frame may be scanned, line-by-line. During such scanning, the clean lines may be skipped so that the number of transactions with memory 235 is reduced. If host 205 only updates a small region of the image, many unnecessary burst reads of memory 235 can be skipped, and significant power saving can be achieved.

The caching feature of the frame buffer portion of memory 235 may be used to reduce memory 235 bandwidth requirements by reducing the amount of memory accesses (e.g., by burst read) of memory 235. In one embodiment, each line of the frame buffer portion of memory 235 may be associated with a clean/dirty bit that is stored in the frame buffer and indicates the clean or dirty status of the line. A line that is determined to be clean may be associated with a clean/dirty bit that is stored in the frame buffer portion of memory 235 and has a high value (e.g., the value of one (1)). A line that is determined to be dirty may be associated with a clean/dirty bit that is stored in the frame buffer portion of memory 235 and has a low value (e.g., the value of zero (0)). Accordingly, the clean/dirty bit of each line may be accessed in the frame buffer portion of memory 235.

Lines that are associated with a clean/dirty bit that indicates a clean line may not be scanned or accessed. That is, clean lines may be skipped such that the amount of memory accesses are reduced. Lines that are associated with a clean/dirty bit that indicates a dirty line may be and, or a combination, of scanned and accessed. For example, a dirty line may be scanned or accessed using a burst read.

EPD controller 200 also includes a pixel finite state machine ("FSM") 245 operatively coupled to EPD internal bus 225 via three first-in/first-out ("FIFO") buffers 250, 255, 260. In particular, current pixel read FIFO buffer 250 is coupled to EPD controller internal bus 225, from which it receives current pixel data. An output of current pixel read FIFO buffer 250 is coupled to an input of FSM 245, which receives current pixel data. New/old pixel and step data read FIFO buffer 255 is coupled to EPD controller internal bus 225, from which it receives new and old pixel and step count data. New/old pixel and step data read FIFO buffer 255 is also coupled to FSM 245, to which it sends new and old pixel and step count data. New/old pixel and step data write FIFO 260 is coupled to FSM 245, from which it receives new and old pixel and step count data. New/old pixel and step data write FIFO 260 is also coupled to EPD controller internal bus 225, to which it sends such data. An output of FSM 245 is coupled to one input of multiplexer 265. Another input of multiplexer 265 is coupled to interface 270. Interface 270 is bi-directionally coupled to EPD controller internal bus 225. Interface 270 is also coupled to phase locked loop ("PLL") and clock 275. Interface 270 is also coupled to LUT 230. An output of multiplexer 265 is coupled to LUT 230. An output of LUT 230 is coupled to shift register 280, which is coupled to EPD 210.

In some embodiments, FSM 245 keeps track of line numbers. At the beginning of the frame (i.e., at the beginning of the first line), FSM 245 may generate a frame_synch signal; at beginning of each line, it may generate a line_synch signal. In some embodiments, EPD 210 has 1200 lines, with each line including 1600 pixels. The frame_synch and line_synch signals may be used by LUT 230.

A bus arbiter 285 is bi-directionally coupled to EPD controller internal bus 225. Bus arbiter 285 includes an internal programmable allocation table. Bus arbiter 285 is further coupled to each FIFO buffer 250, 255, 260 and to interface 270. Thus, bus arbiter is able to control and arbitrate signals on internal bus 225.

An EPD controller according to certain embodiments of the present invention may have four different modes of changing content displayed on an EPD. Each mode provides a different technique for changing an image on an EPD. A first such mode is referred to herein as an "initialization mode." As described in detail in reference to FIG. 3, the initialization mode serves to clear the EPD and allow a subsequent image to be displayed. It should be appreciated that the initialization mode may be different than other modes in that the "old" value of the screen may be essentially ignored. However, it should be appreciated that such a mode may take longer to execute (e.g., more than two seconds).

A second mode is referred to herein as a "monochrome mode." The monochrome mode operates such that pixels may be in only one of two states (e.g., black or white). Monochrome mode may utilize a single bit per pixel (e.g., set to zero for black and one for white). In monochrome mode, mono-update waveforms may be used. In some embodiments, mono-update waveforms only include black-to-white and white-to-black transitions, with contiguous positive or negative pulses. In this case, the waveform can be consolidated into fewer steps with a standard or slower source driver clock. Monochrome mode can significantly reduce panel power consumptions. It should be appreciated that variations may be provided. For example, direct update ("DU") mode may also be used, which also operate in "white" or "black," and take a similar amount of time to execute. In a DU mode, rather than skipping from an "old" pixel to one that is "gray," an "old" pixel may be readily converted to "white" or "black."

Some systems may also map gray to black/white in the same or similar expedited timeframe.

Images displayed in monochrome mode may generally change faster than in grayscale modes. Accordingly, monochrome mode may be used to display video on an EPD. That is, monochrome mode is sufficiently agile to allow for displaying full-screen or partial-screen video images without noticeable lag. Alternately, or in addition, monochrome mode may be used to display cursors, typed or otherwise selected text, and pointers. More particularly, monochrome mode may be used to display a mouse or touchscreen pointer, such as an arrow displayed on an EPD. Because features mentioned in this paragraph may change relatively rapidly, the agility provided by monochrome mode can accommodate their display on an EPD.

The third mode is referred to herein as "grayscale mode." Grayscale mode operates to display images that may incorporate a plurality of shades of gray (e.g., 3, 4, 8, 16, 32, 64, 128 or 256 such shades, including black and white).

The fourth mode is referred to herein as "grayscale clean mode." Grayscale clean mode may provide a better job of getting to the "new" pixel value without leaving a shadow of the "old" pixel value and then following it with a grayscale mode. Thus, grayscale clean mode first clears any image present on the EPD and then displays a subsequent image in grayscale mode. Although four modes are discussed herein, such modes are exemplary only; other modes are possible and contemplated as being used with embodiments of the present invention.

Figure 3:
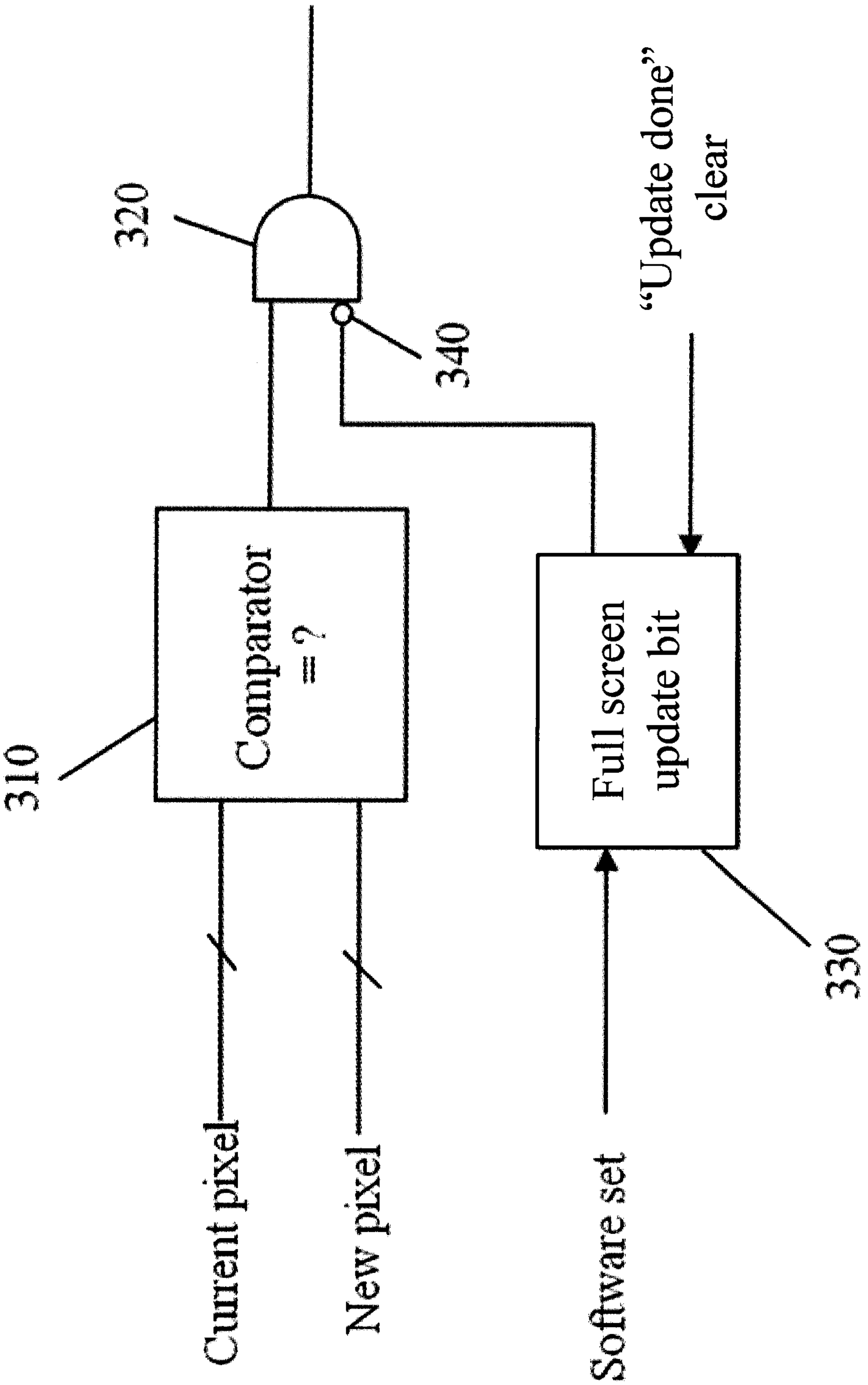
FIG. 3 depicts a logic diagram of an initialization mode component according to an embodiment of the present invention.

FIG. 3 is a logic diagram of an initialization mode component according to an embodiment of the present invention. The initialization mode resets the associated EPD to a known status. Note that, in general, it is possible for data displayed on an EPD to be out of synch with the data in system memory (e.g., the frame buffer portion of memory 235) that is supposed to represent the data being displayed. This may occur due to a variety of circumstances, such as voltage fluctuations, error propagation, temperature change, time (unchanged pixels may fade over time), etc. The initialization mode resets the EPD to a known state, so that the data in system memory matches the EPD display image and so that subsequent images may be displayed correctly. To accomplish this, the initialization mode causes the EPD to perform a clean-up operation, before transitioning to a final level for all pixels (even if the new and current pixels are the same). The final level may be black, white or any shade of gray. The initialization mode may be initiated by the host.

Because other update modes may only act on pixels whose value has changed, a gate may be inserted after a pixel value comparator in order to accommodate the initialization mode. Thus, FIG. 3 depicts a pixel comparator 310, which outputs a logical 1 if a current pixel is identical to a new pixel, and outputs a logical 0 otherwise. An output of comparator 310 feeds into an AND gate 320. An output of an initialization update bit store 330 also feeds into AND gate 320 through a NOT gate 340. Thus, if an initialization bit is not set, the output of initialization bit store is a logical 0, which is converted to a logical 1 by NOT gate 340, resulting in AND gate 320 outputting exactly the state that it receives from pixel comparator 310. On the other hand, if an initialization update bit is set at update bit store 330, its output is a logical 1, which is converted to a logical 0 by NOT gate 340, resulting in AND gate 320 outputting a logical zero despite the state that it receives from pixel comparator 310. Update bit store 330 may be reset by activating a clear bit.

An initialization mode may proceed by rapidly transitioning all pixels in the EPD from black to white and back. Such transitions may occur as part of the initialization mode several times (e.g., 2, 3, 5, 10, 15, 16, 20, 32 or more). Once the transitions have completed, the EPD is set to a final value, which may be black, white, or any shade of gray.

The remaining modes (monochrome, grayscale and grayscale clean) may be performed using a partial update (discussed presently) or a parallel update (discussed below in reference to FIG. 4). In general, after completion of one frame update, all the new and current pixels are the same, and all step counters are reset to zero. For a partial update, in the next scanning loop, if the current pixels are changed and the step count is not zero, these pixels start to update while the rest of the screen is unchanged. That is, a partial update updates only the pixels that have changed. For example, after previous update is done, when scanning to the middle of a frame, the current pixel may be different from the new pixel. In such instances, a partial update may cause this pixel to begin an update procedure without waiting for the process to loop back to the beginning of the frame.

In general, for each mode, when all the waveforms reach the end, and all the current and new pixels are equal, the frame update has completed. At this point, the EPD controller may set a register bit that indicates a frame update has completed to a logical 1, and the EPD may stop running to save power.

Figure 4:
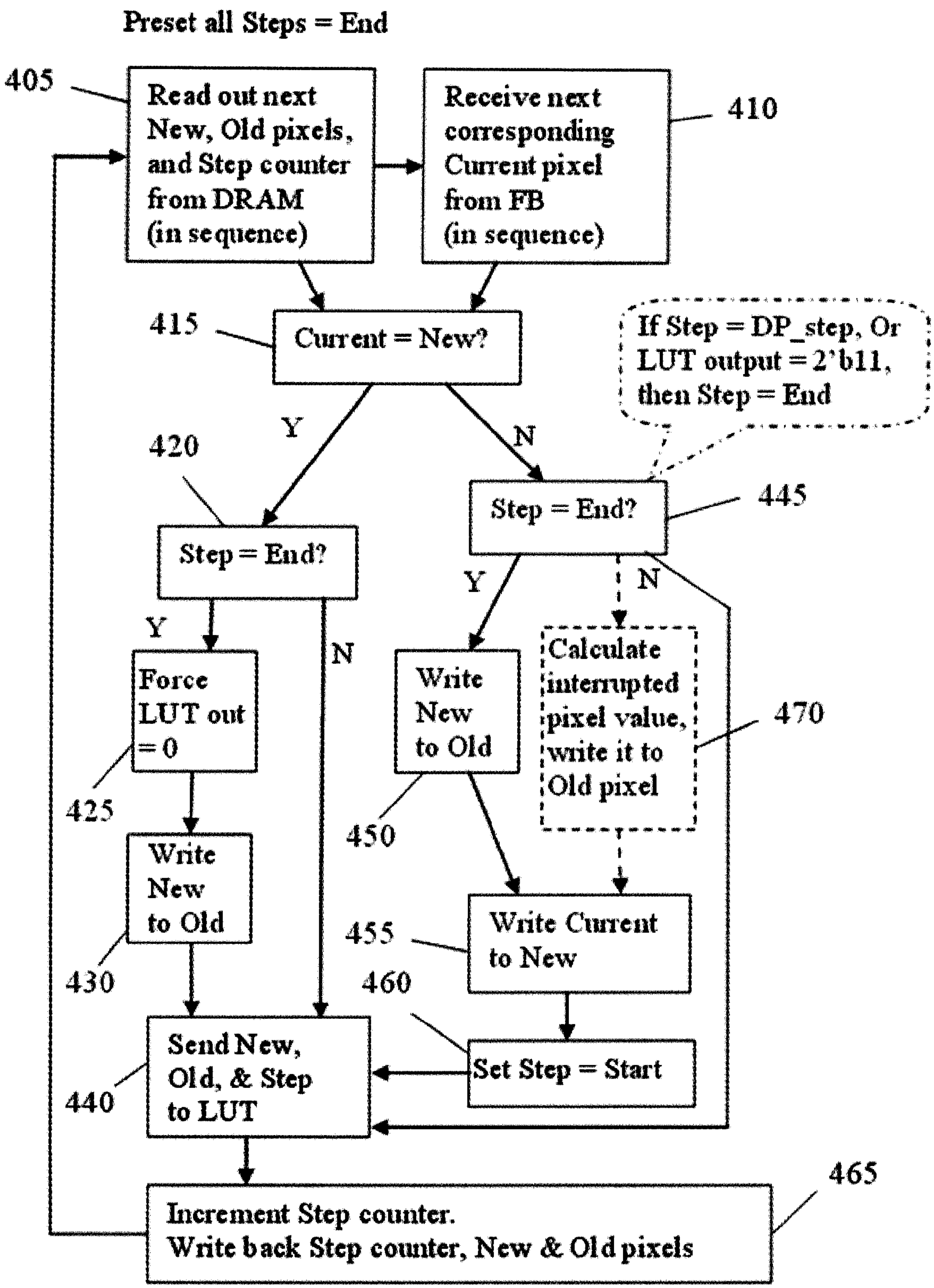
FIG. 4 depicts a flow chart illustrating a parallel pixel update according to an embodiment of the present invention.

FIG. 4 is a flow chart illustrating a parallel pixel update according to an embodiment of the present invention. For a parallel update, each pixel has its own step counter to track its update process. When a pixel value is changed in the frame buffer, that pixel will update right away without waiting for others. In general, the parallel update process continues by sending new pixel data, old pixel data and step counter information to the LUT, which produced output data for the EPD, until the waveform reaches its end. If a current pixel differs from the corresponding new pixel (i.e., the pixel value has changed), then the pixel FSM will take actions to process it.

The process starts at block 405 by reading out the next values of new pixel, old pixel and step counter, e.g., from memory 235. At block 410, the next value for the current pixel is read, e.g., from frame buffer portion of memory 235. At block 415, the current pixel value is compared to the new pixel value (e.g., using a logical structure as depicted in FIG. 3). If the current pixel is the same as the new pixel (i.e., no change), the process branches to block 420, where the associated step counter is polled to determine whether the waveform is at an end. If the waveform is at an end (i.e., all transitional states of the pixel have been processed), the process branches to block 425, in which the LUT is forced to produce a designated end value (e.g., 0) when polled. After block 425, at block 430, the new pixel information is written to the old pixel portion of memory, and the process proceeds to block 440. If, at block 420, the step counter for the pixel indicates that the waveform is in progress, the process proceeds directly to block 440. At block 440, the old pixel value, the new pixel value and the step counter value are transmitted to the LUT, where output data for the EPD is retrieved.

Returning to block 415, if the current pixel value is not equal to the new pixel value, the process branches to block 445, at which the pixel step counter is polled to determine whether the waveform for that pixel is at an end. If so, then the process branches to block 450, at which the new pixel information is written to the old pixel portion of memory, and the process proceeds to block 455, where the current pixel is written to the new pixel memory. After block 455, the process proceeds to block 460, where the step counter is reset to zero, and then to block 440. If the waveform is not at an end, the process branches from block 445 to block 440, at which output data for the EPD is retrieved from the LUT.

After block 440, the process proceeds to block 465, at which the step counter for the pixel is incremented, and the new and old pixel data is updated in memory. The process then returns to block 405, completing one iteration of the parallel update procedure for one pixel.

Note that, in general, the LUT indicates an output to an EPD when provided with an old pixel value, a new pixel value and a step count, which indicates a current transitional state of the associated waveform. If a pixel is in the midst of an update operation (i.e., the associated waveform has not yet been fully processed), a new waveform generally cannot be started unless a starting old pixel value is provided to the LUT. However, intermediate pixel values may be difficult to ascertain, as in some embodiments a pixel's value cannot be determined by polling the EPD itself. Therefore, certain embodiments of the present invention provide a waveform interruption feature, which allows a new waveform to begin prior to an existing waveform's end. That is, a waveform interrupt feature may be used to begin a new waveform prior to an existing waveform's completion. In order to do so, the waveform interrupt feature estimates an intermediate pixel value based on the old pixel value, the new pixel value and the current step count (all previously provided to the LUT). The waveform interrupt feature estimates the current pixel value, and supplies this value as the old pixel value in order to begin a new waveform. That is, the waveform interrupt feature may proceed by supplying the LUT with an old pixel value, which is an estimate, a new pixel value, which represents the new target pixel, and a step count, which may be zero (a zero value may signify that a new waveform is to begin).

Returning now to FIG. 4, at block 445, embodiments that implement a waveform interrupt feature may proceed to block 470 instead of block 440 in the event that the current waveform has not finished. That is, certain embodiments may implement a waveform interrupt feature if the current pixel value is not equal to a new pixel value (as determined at block 415) and if the step counter is not at an end (as determined at block 445). At block 470, the current pixel value is estimated based on the old pixel value, new pixel value and step count, and the estimated value is written to the old pixel memory. The process then proceeds to block 455.

Figure 5:
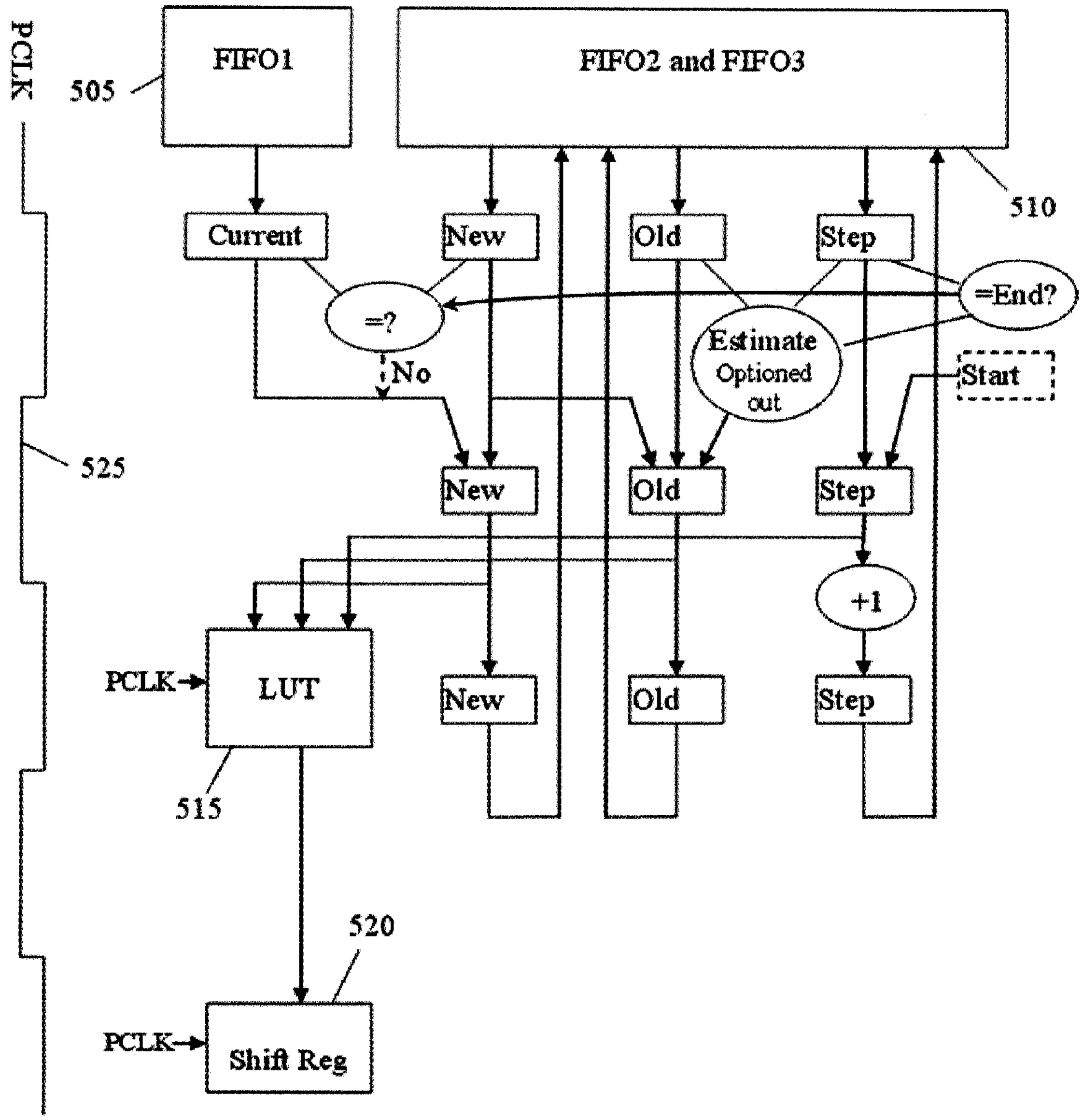
FIG. 5 depicts a pixel pipeline diagram illustrating a parallel pixel update according to an embodiment of the present invention.

FIG. 5 is a pixel pipeline diagram illustrating a parallel pixel update according to an embodiment of the present invention. In particular, FIG. 5 depicts a parallel pixel update with reference to internal components of an EPD controller such as that depicted in FIG. 2. FIFO1 505 may correspond to current pixel read FIFO buffer 250 of FIG. 2, FIFO2 and FIFO3 510 may correspond to 255 and 260, LUT 515 may correspond to LUT 230, and shift register 520 may correspond to shift register 280. A pixel clock signal is depicted at 525. With each pixel clock tick, two pixels are read from FIFO1 505. Also, with each pixel clock tick, two new pixels, two old pixels and two pixel counters are read from FIFO2 and FIFO3 510. Thus, with each pixel clock tick, two pixels are processed. (Note that other embodiments, which process different numbers of pixels with each clock pulse are also contemplated.) If the current pixel and the new pixel are the same, and it is not the end of a update sequence, then this old-new pixel pair and step counter value are sent to the LUT to generate source driver data for the current step. The step counter is incremented after each step. If the update sequence reaches the end, then the new pixel is copied to the old pixel, which cause the LUT to output a zero. If the current pixel and the new pixel are different, it means the current pixel got changed. In this instance, if not during an update sequence (i.e., if at the start of an update sequence), then the process copies the new pixel data to the old pixel memory, copies the current pixel data to the new pixel memory, and starts a new update sequence for this pixel. If the current pixel and the new pixel are different, and it is during an update sequence, then the process increments the step counter by one, and continues the updating sequence. Optionally, a waveform interrupt feature may be implemented, which estimates the changing pixel value, starts a new update sequence from that value, and resets the pixel step counter to zero. Note that in both cases, the new, old, and step counter data are sent to the LUT to generate output data. The updated new and old pixel values, and the step counter values may be written back into the SDRAM after each pixel is processed.

Figure 6:
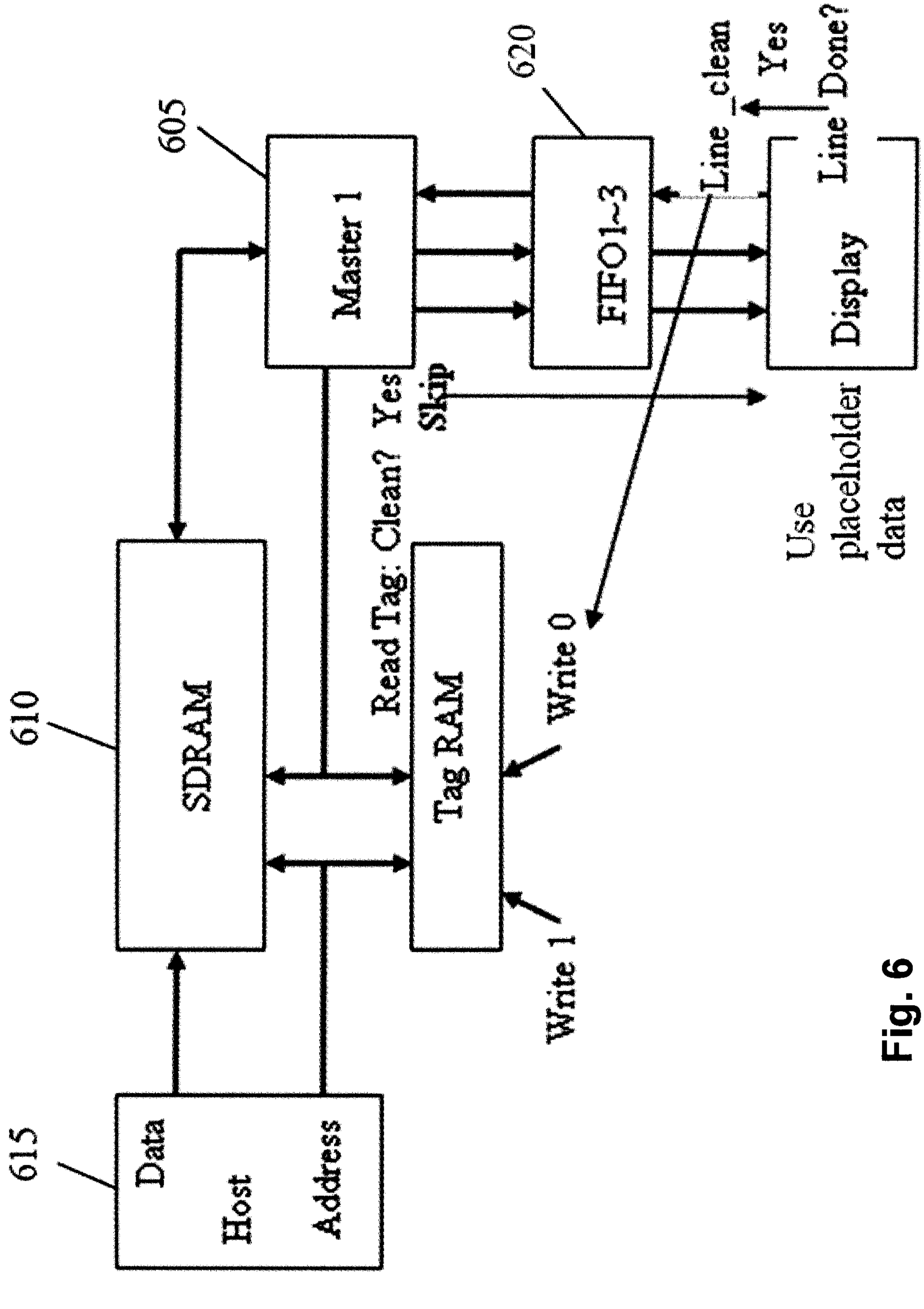
FIG. 6 depicts a schematic diagram that illustrates frame buffer caching according to an embodiment of the present invention.

FIG. 6 is a schematic diagram that illustrates frame buffer caching according to an embodiment of the present invention. In general, caching the contents of the frame buffer (e.g., the frame buffer portion of memory 235 of FIG. 2) provide several advantages. For example, frame buffer caching feature can significantly reduce memory (e.g. SDRAM 235 of FIG. 1) bandwidth requirements, particularly when only a partial image is updated by the host. Because the EPD is non-volatile, it can be treated as an image write-only memory. The frame buffer (i.e., current pixel memory portion) may be treated as a cache. More particularly, as discussed above in reference to FIG. 1, the frame buffer may be divided up into many "lines," where a line is defined to be "clean" if all the pixels in the line have completed their update in the EPD panel, and a line is "dirty" if the host writes one or more new current pixels into the line. In some embodiments, all cache tags are initialized to dirty. During display update scanning, the frame buffer caching feature may allow the clean lines to be skipped, reducing the number of SDRAM transactions. A control bit may be used to turn on or off the frame buffer caching feature.

Referring to FIG. 6, master 1 (605) maintains a set of cache tags, with one bit per cache line. These tags may be stored in memory (e.g., Tag RAM 610 or SDRAM 610) either on or off of the main EPD controller. For each tag, a value of Tag=0 may indicate that the corresponding cache line is clean; a value of Tag=1 may indicate that the corresponding cache line is dirty.

In the process of scanning the frame buffer present in memory 610, master 1 (605) checks the state of the cache tag for the line to be retrieved. For a dirty cache line, the display operation may behave as if there were no frame buffer caching. If a cache line is clean, on the other hand, the read transfer of SDRAM 610 is skipped, as described above. In this case, master 1 (605) asserts a skip signal, and the EPD controller feeds placeholder data into the display pipeline (e.g., FIFO 1-3 620). Such placeholder data may consist of equal old and new pixel pairs, with step counters set to zero (i.e., "end"). Such placeholder data will cause no change in the EPD display. If host 615 only updates a small region of the image, then the frame buffer caching feature reduces the number of SDRAM burst reads, as the clean lines can be skipped, and significant power saving can be achieved.

Embodiments of the present invention may include further power management features. Since EPD are persistent, once a frame is updated, it need not be continuously refreshed. Therefore, some embodiments limit or stop power consumption by one or both of the EPD controller and the EPD itself once a frame update completes. This may be accomplished as follows. Completion of a frame update generally involves completing all steps of all associated waveforms (e.g., a separate waveform for each pixel that has changed). When all such waveforms complete their respective steps, all current pixels should equal all new pixels, as such pixels are reflected in memory. At this point, the frame update is complete. Accordingly, the EPD controller may set an update bit (e.g., Update_Done=1) to signal to its host that the update is complete. At that point, all power to the EPD may be suspended, e.g., by the EPD controller. (Upon the host updating current pixels in the frame buffer, at leas tone line will become dirty, and the EPD controller may resume full power operation and begin updating the frame.)

An alternate or additional power saving feature is which the host CPU may be turned off is described presently. Before the EPD controller completes a frame update, but after image information is read, the EPD controller may signal that it has completed receiving such data. The host CPU may shut down in response to such signal. In the alternative, the EPD controller may use hardware or software to initiate a suspend mode by itself and a complex programmable logic device ("CPLD") that operates as a power controller. Suspend mode may be initiated and terminated by either hardware or software.

Exemplary power management features are disclosed in co-pending U.S. application Ser. No. 12/497,199, entitled "Electronic Display Controller," filed on Jul. 2, 2009, which is hereby incorporated by reference in its entirety.

It should be appreciated that certain embodiments may allow host systems to provide image data (e.g., in the form of data on a pixel bus) to an EPD controller 200, which accounts for the specific needs of EPD. In such embodiments, the EPD controller 200 may provide a series of output signals to the EPD to effectuate the display of the corresponding image. Such embodiments may allow a host to provide image data to an EPD in essentially the same manner as it would provide image data to a CRT or LCD display. As one example, certain embodiments may translate image data to appropriate waveforms, which effectuate displaying the corresponding image on an EPD. As another example, certain embodiments account for temperature-dependent EPD requirements in a manner that is completely transparent to the host. As another example, certain embodiments may allow for use of different waveforms so that trade-offs are made between speed to update a frame and resultant image fidelity. Also, power may be saved by turning off the EPD controller 200 after the EPD is disabled, e.g., in response to lack of user activity, etc.

Figure 7:
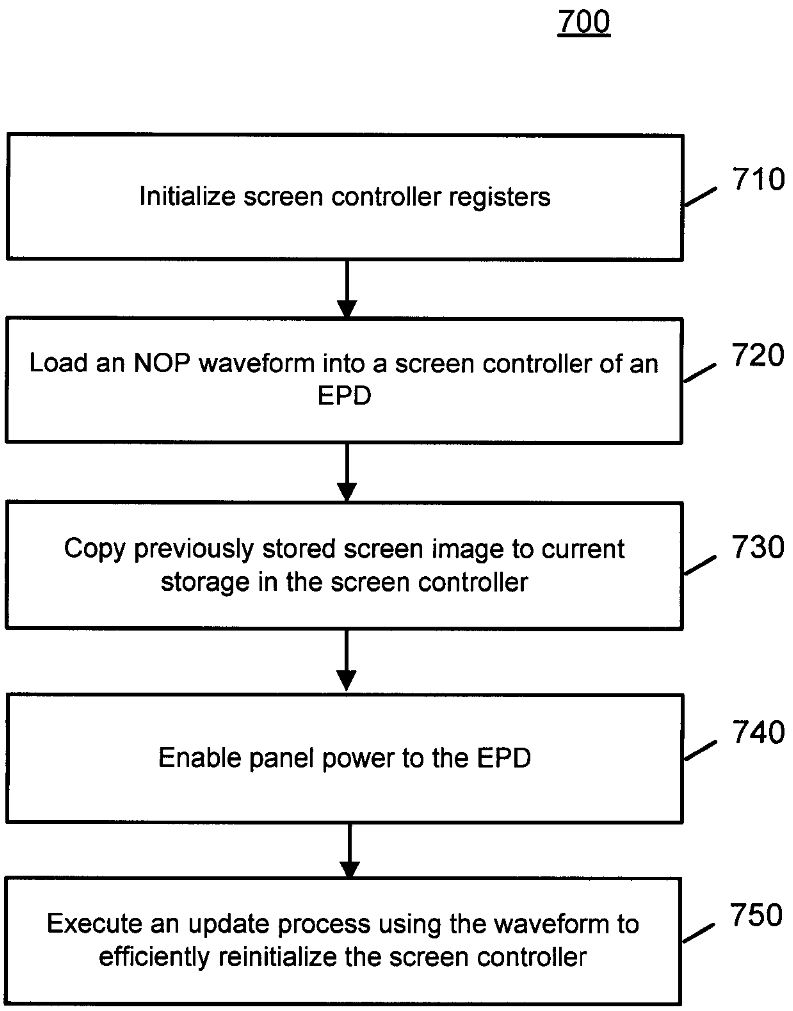
FIG. 7 depicts an illustrative flowchart for reinitializing a screen controller, according to an exemplary embodiment.

FIG. 7 depicts an illustrative flowchart for reinitializing a screen controller, according to an exemplary embodiment. The exemplary method 700 is provided by way of example, as there are a variety of ways to carry out the methods disclosed herein. The method 700 shown in FIG. 7 may be executed or otherwise performed by one or a combination of various systems. The method 400 is described below as carried out by at least system 200 in FIG. 2, by way of example, and various elements of system 100 are referenced in explaining the example method of FIG. 7. Each block shown in FIG. 7 represents one or more processes, methods, or subroutines carried in the exemplary method 700. A computer readable medium comprising code to perform the acts of the method 700 may also be provided.

In order to efficiently reinitialize a screen controller, upon power up, to match current content of a bi-stable screen of an electronic display device, a new class of waveform may be introduced. This new class of waveform may be referred to as a "No Operation" ("NOP") waveform. An NOP waveform may not indicate a positive or negative screen voltage and therefore may not change the actual visible EPD display. The NOP waveform may also ignore both the "old" and "new" pixel values, e.g., where transitions may be identical or similar for one or more combinations. In some embodiments, a NOP waveform may be implemented as a LookUp Table (LUT), as described above.

Referring to FIG. 7, at block 710, at least one computer processor may initialize screen controller registers. For example, at least one host computer processor 205 associated with the EPD controller 200 may power on the screen controller and initialize a set of registers to relevant values.

It should be appreciated that, in this example, when the EPD controller 200 is turned off to save power, the currently displayed pixel state data may not be saved. However, when the EPD controller 200 is turned on again, several actions may be performed to restore the current pixel state data to the EPD controller 200.

At block 720, the at least one computer processor associated with the EPD controller 200 (e.g., the host controller 205) may load a waveform into the screen controller. In some embodiments, the waveform may be loaded into the screen controller upon reactivation or powering of the electrophoretic display. This may occur when the device is powered on. The waveform may be for terminating pixel-to-pixel transformations of a screen of the electrophoretic display device. In some embodiments, the waveform may be a no operation ("NOP") waveform. It should be appreciated that the NOP waveform may be used when the screen controller of the electrophoretic display device is deactivated or powered off. It should be appreciated that typical waveforms use between 39 and 50 steps and are generally temperature dependent. In some embodiments, loading the NOP waveform may be achieved by setting the LUT memory 230 or 440 with all ones (e.g., 0xffff).

At block 730, the previous stored screen image may be loaded into the current memory storage area of the screen controller. For example, the last known screen image (which may have been retained on host 205) may be loaded via direct memory access ("DMA") to the current memory area of the screen controllers DRAM 235. It should be appreciated that his may be the same or similar operation the host 205 may normally use when introducing new content to the screen. Therefore, such operation may be optimized for controller operation. It should also be appreciated that block 730 may be achieved by a host controlled DMA operation. It should also be appreciated that copying previously stored screen image data comprises providing direct memory access of approximately 1 MB of screen content from system memory to the current storage area of the screen controller.

At block 740, the EPD panel may be energized (e.g., powered on). Energizing the EPD power may be initiated by a quick register setting by the host 205, but may also require a substantial wait (e.g., milliseconds) before powering on is finished. Alternately, in other embodiments, the host 205 may defer energizing the EPD power until some subsequent graphics operation is initiated, e.g., that may actually change the EPD pixels. It should be appreciated that any sequencing order for this powering operation may be provided since the NOP waveform may not generate positive or negative signals to the screen.

It should be appreciated that parallelization may be provided. For example, several actions of the exemplary method 700 may be performed concurrently and/or in parallel. In one or more embodiments, blocks 720, 730, and/or 740 may be performed by the at least one system memory controller and/or the at least one computer processor in parallel. Accordingly, such parallelization may be an efficient implementation of method 700. Other various embodiments may also be provided.

At block 750, the at least one computer processor may then execute an update process to efficiently reinitialize the screen controller of the electrophoretic display. For example, a screen update process utilizing the loaded NOP waveform may be initiated by the host 205. This update may take several sequencing steps, e.g., a maximum of three full, to pass thru memory to complete. In some embodiments, this may take approximately 60 milliseconds to complete. Once initiated, the host computer may continue while the screen controller operations finish. For instance, the host 205 may be processing the next image to display. When the display update is complete, the effect may appear to have been to copy the "current" pixel values into the "new" and "old" portion of memory 235. As an end result, the pixel state memory 235 may now correspond to what would have existed before the screen controller was turned off.

It should be appreciated that the update process may comprise moving pixels that are from a "staging area" to a "pixel interleave area" for display. For example, the pixels may be moved from the staging area to a "next" pixel interleave area and then moved to a "current" pixel interleave area, which is the pixel interleave area for display.

For example, referring back to FIG. 4, it may be determined that the worst case execution time is three passes. For instance, it may be understood that memory corresponding to block 405 may not been initialized so that values of "new," "old," and "step" are considered as random. On pass 1, a typical pixel may take the No case of test 445 which may set Step=End for the next pass. The second pass may then go thru 455 (e.g., copy "current" to "new"). The third pass may then go thru 430 (e.g., copy "new" to "old"). Pixels where the initial values happen to have Current!=New and Step=End may therefore take two passes (455, 430). Pixels where the initial values happen to have Current=New may take two steps (Step!=End) or one step (Step=End) but may still end up with Current=New=Old.

Ultimately, such flexibility in pixel initialization and/or movement improves efficiency of the EPD 200 and reduces display time. Not only does this provide ease of use for users of EPDs, power consumption is decreased. Thus, embodiments of the present invention may uniquely and efficiently provide reinitialization (and initialization) of the EPD screen.

It should be appreciated that while embodiments are directed to EPDs, other various embodiments may also be provided. For example, implementation may also be applied to other display types that may benefit from the above described embodiments, processes, and/or techniques. Other various embodiments may also be provided.

While the features and functionalities of the systems and methods are primarily directed to reinitialization of the screen controller, it should be appreciated that the features and functionalities of may be applied to other display components as well. Furthermore, while the advertisement content is described primarily in a visual display, it should be appreciated that the content may include multimedia, audio, and/or other presentments of an electronic device.

Other embodiments, uses, and advantages of the present invention will be apparent to those skilled in the art from consideration of the specification and practice of the present invention disclosed herein. The specification and drawings should be considered exemplary only, and the scope of the present invention is accordingly intended to be limited only by the following claims and equivalents thereof.

We claim:

1. A method for reinitializing a screen controller of an electrophoretic display device (EPD) upon power-up of the EPD, the method comprising:

providing a memory configured to store:

old pixel data indicating states of pixels in an initial frame of the EPD;

new pixel data indicating target states of pixels in a new frame for the EPD; and current pixel data indicating current states of pixels as the EPD transitions from the initial frame to the new frame; and responsive to power-up of the EPD, reinitializing the memory, the reinitializing comprising:

reinitializing the current pixel data by replacing at least a portion of the current pixel data with corresponding screen image data previously stored in a persistent memory;

reinitializing the new pixel data by replacing at least a portion of the new pixel data with a corresponding portion of the current pixel data; and reinitializing the old pixel data by replacing at least a portion of the old pixel data with a corresponding portion of the new pixel data.

2. The method of claim 1, wherein replacing at least the portion of the new pixel data comprises:

comparing a first indicated state of a pixel to a second indicated state of the pixel, the first indicated state in the current pixel state section and the second indicated state in the new pixel state section; and responsive to the first indicated state being different than the second indicated state, updating the second indicated state to match the first indicated state.

3. The method of claim 1, wherein reinitializing the memory is responsive to a no operation waveform.

4. The method of claim 1, wherein replacing at least a portion of the current pixel data comprises copying approximately 1 MB of previously stored screen image data from persistent memory via direct memory access, the screen image data comprising previous content of the current pixel state section of the memory and not including corresponding previous content of the new and old pixel state sections of the memory.

5. The method of claim 1, wherein replacing at least a portion of the old pixel data comprises:

comparing a first indicated state of a pixel to a second indicated state of the pixel, the first indicated state in the new pixel state section and the second indicated state in the old pixel state section; and responsive to the first indicated state being different than the second indicated state, updating the second indicated state to match the first indicated state.

6. A non-transitory computer readable medium storing executable computer program code for reinitializing a screen controller of an electrophoretic display device upon power-up of the EPD, the computer program code comprising instructions for:

providing a memory configured to store:

old pixel data indicating states of pixels in an initial frame of the EPD;

new pixel data indicating target states of pixels in a new frame for the EPD; and current pixel data indicating current states of pixels as the EPD transitions from the initial frame to the new frame; and responsive to power-up of the EPD, reinitializing the memory, the reinitializing comprising:

reinitializing the current pixel data by replacing at least a portion of the current pixel data with corresponding screen image data previously stored in a persistent memory reinitializing the new pixel data by replacing at least a portion of the new pixel data with a corresponding portion of the current pixel data and reinitializing the old pixel data by replacing at least a portion of the old pixel data with a corresponding portion of the new pixel data.

7. The non-transitory computer readable medium of claim 6, wherein replacing at least the portion of the new pixel data comprises:

comparing a first indicated state of a pixel to a second indicated state of the pixel, the first indicated state in the current pixel state section and the second indicated state in the new pixel state section; and responsive to the first indicated state being different than the second indicated state, updating the second indicated state to match the first indicated state.

8. The non-transitory computer readable medium of claim 6, wherein reinitializing the memory is responsive to a no operation waveform.

9. The non-transitory computer readable medium of claim 6, wherein replacing at least a portion of the current pixel data comprises copying approximately 1 MB of previously stored screen image data from persistent memory via direct memory access, the screen image data comprising previous content of the current pixel state section of the memory and not including corresponding previous content of the new and old pixel state sections of the memory.

10. The non-transitory computer readable medium of claim 6, wherein replacing at least a portion of the old pixel data comprises:

comparing a first indicated state of a pixel to a second indicated state of the pixel, the first indicated state in the new pixel state section and the second indicated state in the old pixel state section; and responsive to the first indicated state being different than the second indicated state, updating the second indicated state to match the first indicated state.

11. A system for reinitializing a screen controller of an electrophoretic display (EPD) upon power-up of the EPD, the system comprising:

a memory configured to store:

old pixel data indicating states of pixels in an initial frame of the EPD;

new pixel data indicating target states of pixels in a new frame for the EPD; and current pixel data indicating current states of pixels as the EPD transitions from the initial frame to the new frame; and a system memory controller configured to, responsive to power-up of the EPD, reinitialize the memory, reinitializing the memory comprising:

reinitializing the current pixel data by replacing at least a portion of the current pixel data with corresponding screen image data previously stored in a persistent memory;

reinitializing the new pixel data by replacing at least a portion of the new pixel data with a corresponding portion of the current pixel data and reinitializing the old pixel data by replacing at least a portion of the old pixel data with a corresponding portion of the new pixel data.

12. The system of claim 11, wherein replacing at least the portion of the new pixel data comprises:

comparing a first indicated state of a pixel to a second indicated state of the pixel, the first indicated state in the current pixel state section and the second indicated state in the new pixel state section; and responsive to the first indicated state being different than the second indicated state, updating the second indicated state to match the first indicated state.

13. The system of claim 11, wherein reinitializing the memory is responsive to a no operation waveform.

14. The system of claim 11, wherein replacing at least a portion of the old pixel data comprises:

comparing a first indicated state of a pixel to a second indicated state of the pixel, the first indicated state in the new pixel state section and the second indicated state in the old pixel state section; and responsive to the first indicated state being different than the second indicated state, updating the second indicated state to match the first indicated state.

15. The system of claim 11, wherein replacing at least a portion of the current pixel data comprises copying approximately 1 MB of previously stored screen image data from persistent memory via direct memory access, the screen image data comprising previous content of the current pixel state section of the memory and not including corresponding previous content of the new and old pixel state sections of the memory.

16. The system of claim 11, further comprising a pixel-look-up table, operably coupled with the system memory controller, configured to store waveforms indicating how pixels of the EPD are to be updated, wherein a no operation waveform that indicates the pixels of the EPD are to remain unchanged is stored while the memory is being reinitialized.

* * * * *

UNITED STATES PATENT AND TRADEMARK OFFICE

CERTIFICATE OF CORRECTION

PATENT NO. : 8,730,152 B2
APPLICATION NO. : 12/575236
DATED : May 20, 2014
INVENTOR(S) : Robert Lawrence Hare et al.

It is certified that error appears in the above-identified patent and that said Letters Patent is hereby corrected as shown below:

In the Claims

Column 15, line 3, after “data,” insert --;--.

Column 16, line 10, after “data,” insert --;--.

Signed and Sealed this
Thirty-first Day of March, 2015

Michelle K. Lee
*Director of the United States Patent and Trademark Office*